(12) United States Patent
Cummings et al.

(10) Patent No.: US 11,587,460 B2
(45) Date of Patent: Feb. 21, 2023

(54) METHOD AND SYSTEM FOR ADAPTIVE LANGUAGE LEARNING

(71) Applicant: IXL LEARNING, INC., San Mateo, CA (US)

(72) Inventors: Chris Cummings, Arlington, VA (US); Helena Witte, Lyme, NH (US)

(73) Assignee: IXL Learning, Inc., San Mateo, CA (US)

( * ) Notice: Subject to any disclaimer, the term of this patent is extended or adjusted under 35 U.S.C. 154(b) by 449 days.

(21) Appl. No.: 16/749,952

(22) Filed: Jan. 22, 2020

(65) Prior Publication Data

US 2021/0225198 A1 Jul. 22, 2021

(51) Int. Cl.
*G09B 19/06* (2006.01)
*G09B 7/04* (2006.01)
*G10L 15/22* (2006.01)
*G09B 7/08* (2006.01)

(52) U.S. Cl.
CPC ............... *G09B 19/06* (2013.01); *G09B 7/04* (2013.01); *G09B 7/08* (2013.01); *G10L 15/22* (2013.01); *G10L 2015/225* (2013.01)

(58) Field of Classification Search
CPC .......... G09B 19/00; G09B 19/06; G09B 7/00; G09B 7/04; G09B 7/08
See application file for complete search history.

(56) References Cited

U.S. PATENT DOCUMENTS

| | | | |
|---|---|---|---|
| 6,234,802 B1 * | 5/2001 | Pella | G09B 7/04 434/156 |
| 11,062,615 B1 * | 7/2021 | Speciner | G09B 5/06 |
| 2006/0063139 A1 * | 3/2006 | Carver | G09B 17/00 434/178 |
| 2007/0015121 A1 * | 1/2007 | Johnson | G09B 7/02 434/156 |

FOREIGN PATENT DOCUMENTS

| | | | | |
|---|---|---|---|---|
| JP | 0124139 A2 * | 9/1999 | | G09B 19/04 |
| WO | WO-2016185289 A1 * | 11/2016 | | G06F 3/0481 |

* cited by examiner

*Primary Examiner* — Robert J Utama
(74) *Attorney, Agent, or Firm* — Kiklis and Clark, PLLC

(57) ABSTRACT

Methods and systems provide an adaptive method of language learning using automatic speech recognition that allows a user to learn a new language using only their voice—and without using their hands or eyes. The system may be implemented in an application for a smartphone. Each lesson comprises a series of questions that adapt to the user's knowledge. The questions ask for the translation of a word or phrase by playing an audio prompt in the origin language, recording the user speaking the translation in the target language, indicating whether the utterance was correct or incorrect, and providing feedback related to the user's utterance. Each user response is evaluated in real time, and the application provides individualized feedback to the user based on their response. Subsequent questions in the lesson and future lessons are dynamically ordered to adapt to the user's knowledge.

30 Claims, 17 Drawing Sheets

METHOD AND SYSTEM FOR ADAPTIVE LANGUAGE LEARNING

FIELD OF THE INVENTION

This generally relates to a language learning system and more particularly to an adaptive language learning system that may operate hands-free and eyes-free.

BACKGROUND

Most computer-assisted language learning programs have low success rates in helping people achieve basic proficiency. One reason programs often come up short is that they rely too heavily on artificial question types like true-false, multiple-choice, and repeat-after-me, that don't reflect the challenge-level of actually speaking the new language. There is no multiple-choice in real-world conversations. Another reason is that the programs rely on using your hands for touching, clicking, and selecting as the method of interaction, which also doesn't simulate the experience of actually speaking in the new language. Furthermore, physically interacting with a screen prohibits practicing while on the go, such as while driving, walking, or cooking. Finally, programs often fail to adapt to the user's prior knowledge, pace of learning, and other individual characteristics, so the rate of progress is slowed down significantly because of a lack of personalization.

Audio-based courses like those from Pimsleur were developed in the 60's and provided people with a way to learn languages by listening to tapes. The programs asked users to repeat words and phrases and then challenged them to put together new sentences with what they had learned. The audio-based courses were excellent for their emphasis on encouraging people to speak and allowing people to practice while driving in their car. However, they were not interactive in the sense that they could evaluate the user's spoken utterances, provide feedback, and then adapt the course to the user's knowledge. This limited its level of effectiveness and engagement.

Screen-based courses like those from Rosetta Stone, Babbel, Fluencia, and Duolingo fostered a new era of interactivity, encouraging people to answer true-false, multiple-choice, repeat-after-me, and open-input questions. The programs could grade a user's response and provide feedback on a user's performance. However, the programs could not be used without a user's attention on the screen, and a user's physical interaction with a computing device. This greatly reduced the scenarios in which a user could practice learning a language and the opportunity to practice the spoken aspects of language.

Accordingly, there is a desire for methods and system to solve these and other related problems.

SUMMARY

In accordance with the present disclosure, a method in a data processing system is provided for hands-free and eyes-free automated adaptive language learning, comprising transmitting an audio prompt of a term in an origin language for the user to learn the translation in a target language, and receiving a recording of audio from the user. The method further comprises analyzing the recording of the received audio, determining if the user accurately stated the translation of the term in the target language in the recording, and if the user did not state the translation of the term accurately in the recording, transmitting a second audio prompt of a second term to the user based on the first term.

In another implementation, a data processing system for hands-free and eyes-free automated adaptive language learning is provided comprising a memory configured to store instructions to cause a processor to transmit an audio prompt of a term in an origin language for the user to learn the translation in a target language. The instructions further cause the processor to receive a recording of audio from the user, analyze the recording of the received audio, and determine if the user accurately stated the translation of the term in the target language in the recording. Finally, the instructions further cause the processor to, if the user did not state the translation of the term accurately in the recording, transmitting a second audio prompt of a second term to the user based on the first term. The processor is configured to execute the instructions.

DETAILED DESCRIPTION

Methods and systems in accordance with the present disclosure provide an adaptive method of language learning using automatic speech recognition that allows a user to learn a new language using only their voice—and without using their hands or eyes. The system and method may be implemented, for example, in an application for a smartphone. This method involves lessons where the user uses a language they know, the "origin" language, to learn one or more concepts in the language they wish to learn, the "target" language. Each lesson comprises a series of questions that adapt to the user's knowledge. The questions essentially ask "What is the translation of this word or phrase?" by playing an audio prompt or a term in the origin language, recording the user speaking the translation in the target language, indicating whether the utterance was correct or incorrect, and providing feedback related to the user's utterance. Subsequent questions in the lesson and in future lessons are dynamically ordered to adapt to the user's knowledge.

Conventionally, there has been no automated way to learn a language with an adaptive method based on speaking alone. These methods and systems use speech recognition technology to help people learn to speak a new language by actually speaking the new language. The system is based on a series of questions that a user answers. Each user response is evaluated in real time, and the application provides individualized feedback to the user based on their response. As the person answers questions, the quiz adapts to a learner's knowledge, providing additional practice where it is needed most. Because the experience is designed to be easily used without looking at a screen or touching a device, the application and method empowers people to learn while on the go—for example while driving, walking, or cooking—opening up new possibilities for when a person can study. The result is a method of learning that is faster, more fun, and more effective than previous computer-based language-learning programs.

Figure 1:
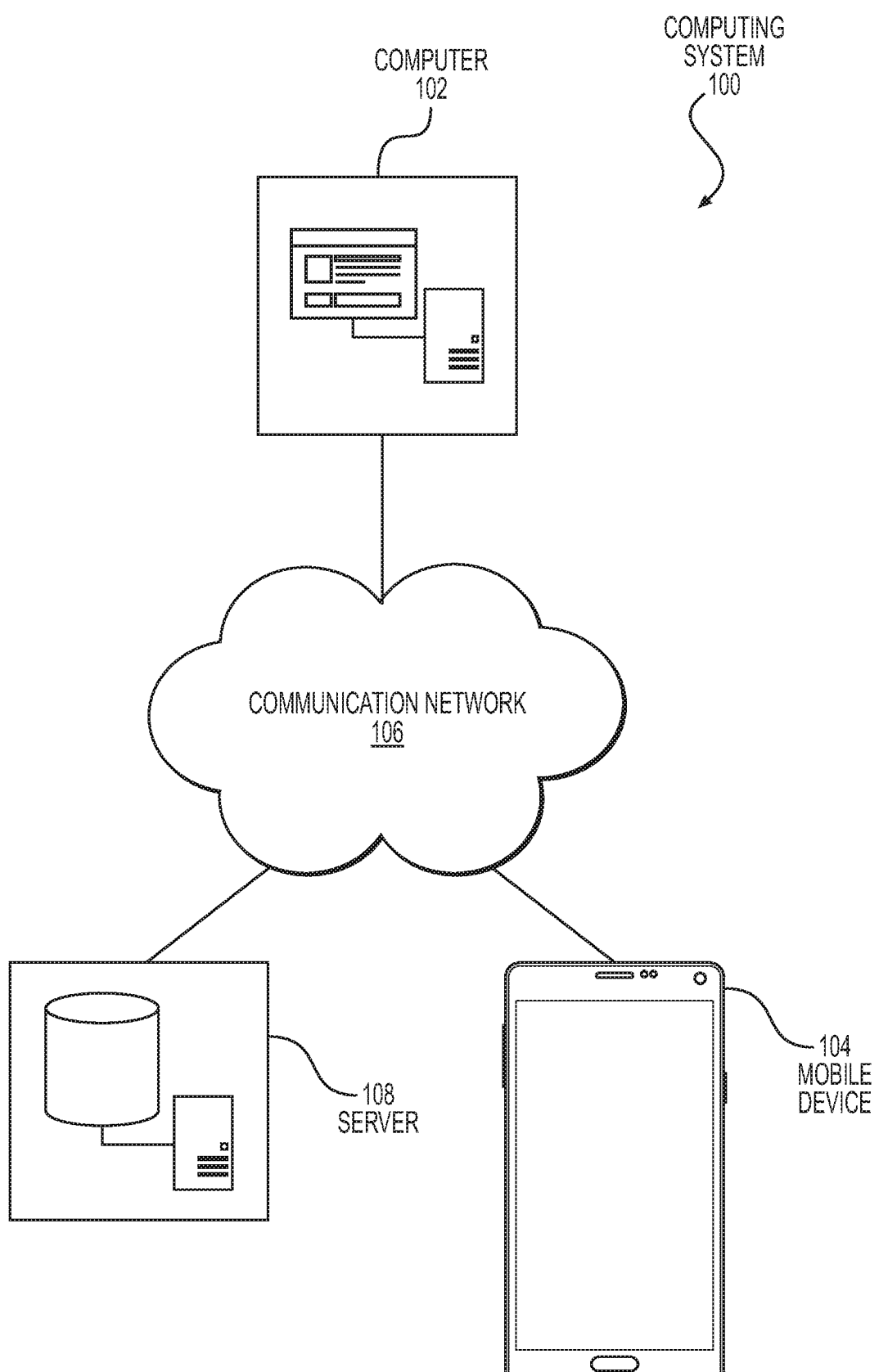
FIG. 1 illustrates a computer network in accordance with the present methods and system.

FIG. 1 is a diagram that illustrates a computing system 100 in which various embodiments of the method and the system may be implemented. The computing system 100 may include a computer 102, a mobile device 104, a server 108, and a communication network 106. The computer 102 or mobile device 104 may be used by a user to learn a language. In an embodiment, the computer 102, and the mobile device 104 may communicate with the server 108 via the communication network 106, such as the Internet. Although only one computer 102 and one mobile device 104 are shown, many more devices may be used with the computing system 100, whereas there may be many users on the system. Although computer 102 is called a computer, it may be used by any other computing device, such as a tablet, smart phone, watch, voice-activated speaker, augmented reality device or environment, virtual reality device or environment, or other suitable computing devices.

In an embodiment, the server 108 may refer to a computing device, such as a computer or server, that includes a memory for storing a program for implementing methods and systems consistent with the present disclosure, and a program that executes the program in the server 108. The computer 102 and mobile device 104 may interact with the server 108 to execute the procedures disclosed. Server 108 may not necessarily functionally operate as a separate entity, whereas in an embodiment, the functionalities of the server 108 can be integrated into the computer 102 and/or the mobile device 104.

In one implementation, server 108 may operate as a web server on the communication network 106 such as the Internet. Computer 102 and mobile device 104 may also represent other computers on the Internet, such as users' computers having web browsers. Computer 102 and mobile device 104 may have include web browsers and/or mobile apps and may be used by users to access the Internet or other network and access server 108. There may be any number of user computers and any number of server computers. Users of the computers 102 and mobile devices 104, for example, may be users learning a language by accessing the server 108.

Figure 2:
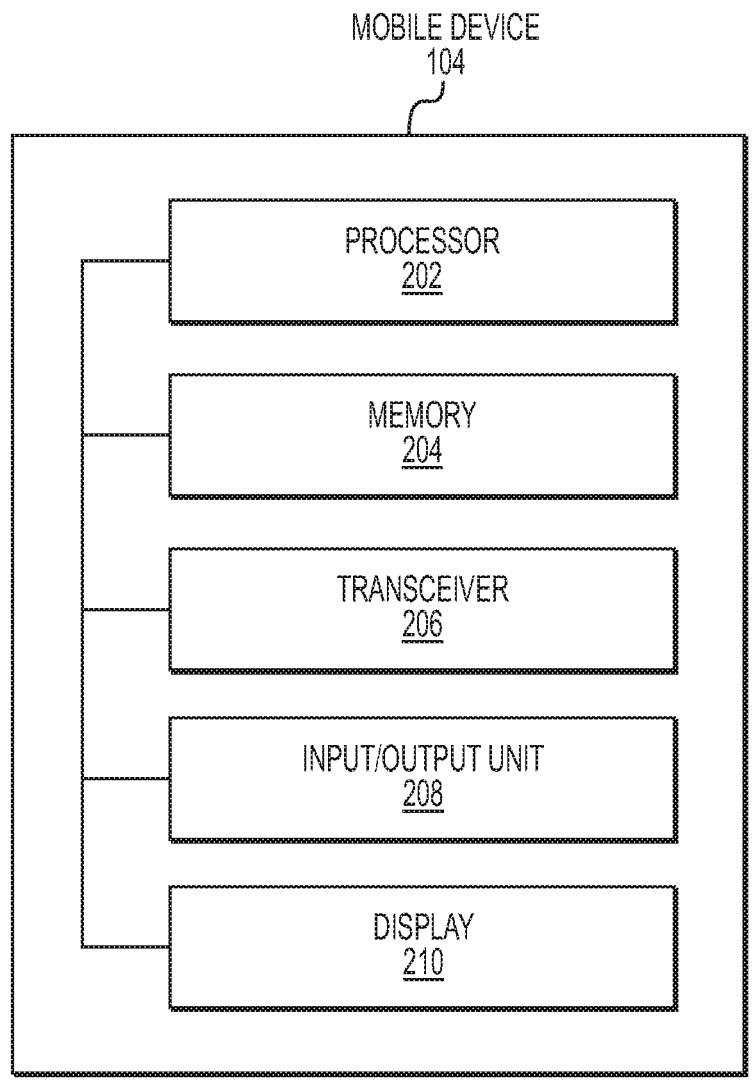
FIG. 2 depicts a computing device in accordance with present methods and systems.

FIG. 2 depicts a mobile device 104 used by a user to learn a language. The mobile device 104 may comprise a processor 202, a memory 204, a transceiver 206, an input/output unit 208 and display 210. The memory 204 stores a program for implementing methods and systems consistent with the present disclosure, which is executable by the processor 202. In some implementations, the mobile device 104 is a mobile smartphone.

Either the computer 102 or the mobile device 104 may be a desktop computer, a laptop, tablet computer, a smartphone, or the like. These devices are capable of accessing (or being accessed over) a network (e.g., using wired or wireless communication capabilities). These devices are used by users to access the system and website or mobile application.

Computer 102 may comprise of one or more processors and one or more memories. The one or more memories may include computer readable code that may be executable by the one or more processors to perform predetermined operations. The computer 102 may be a computer that further comprises a processor, a memory, a transceiver, and an input/output unit. The memory stores a program for implementing methods and systems consistent with the present disclosure, which is executable by the processor.

To learn a language, the user starts the system in a manner that is customary for the computing device onto which it has been loaded, such as by selecting an application icon on a smart phone or tablet device, typing the name of the application, or speaking the name of the application.

Figure 3:
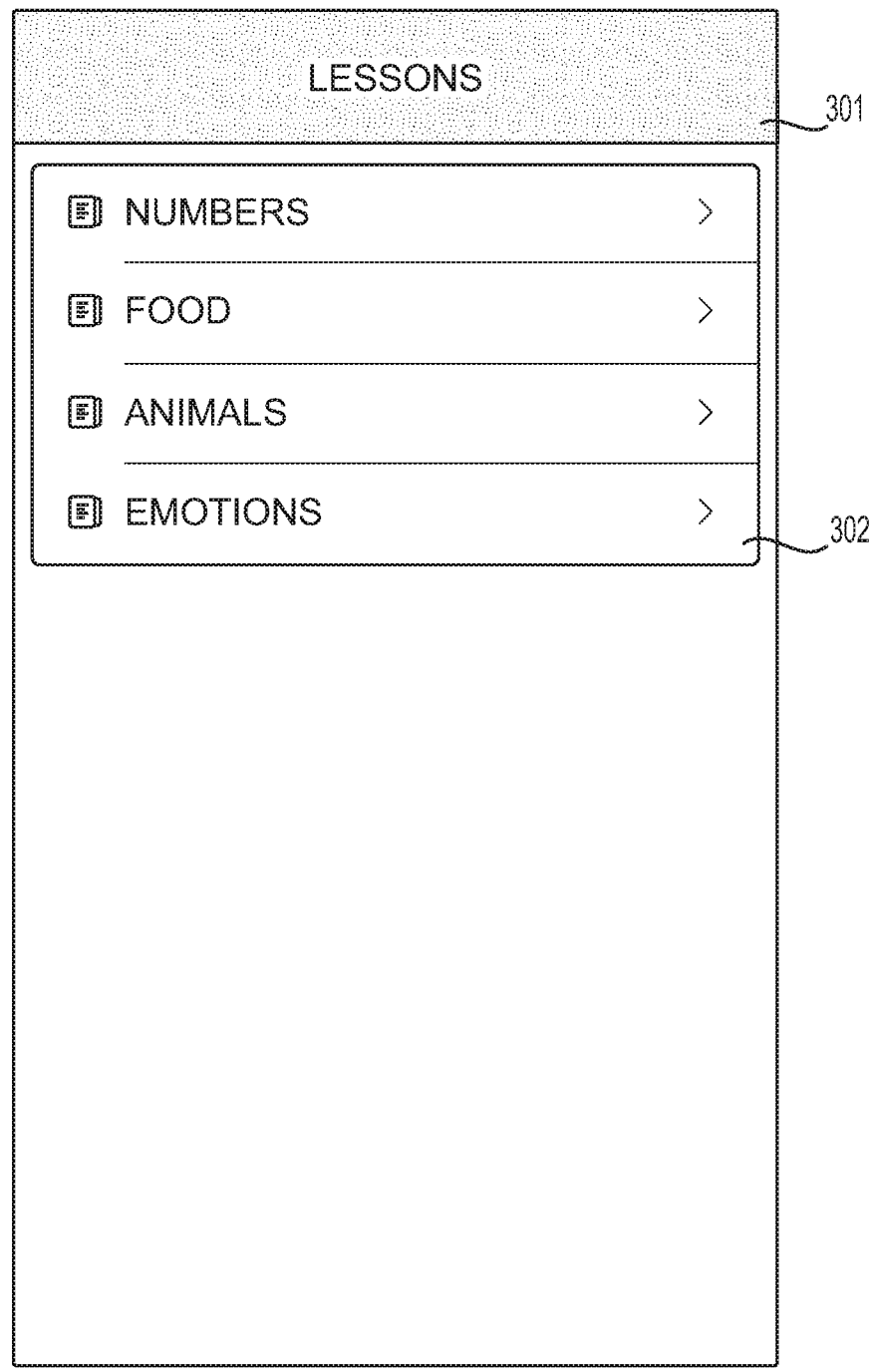
FIG. 3 shows the lesson selection screen on the app that may appear when the application is started.

FIG. 3 shows the lesson selection screen on the app that may appear when the application is started. The system presents the user with a list of lessons 301. The user can choose a lesson 302 by clicking or tapping on a lesson or speaking the name of the lesson into the system. Each lesson 302 in the list of lessons 301 may be a pre-created lesson from the system or a user-created lesson about a particular topic, such as a set of user-entered vocabulary words that they want to learn. The questions in the lesson 302 can be dynamically ordered based on a variety of factors, including 1) the lesson author's preferences, 2) the user's prior history with the topics covered in the lessons and/or 3) the difficulty of the topics covered. The lesson 302 may also include a dynamic mix of topics to review—such as vocabulary words or grammar topics that the user is likely to be forgetting—and new topics to learn.

Figure 4:
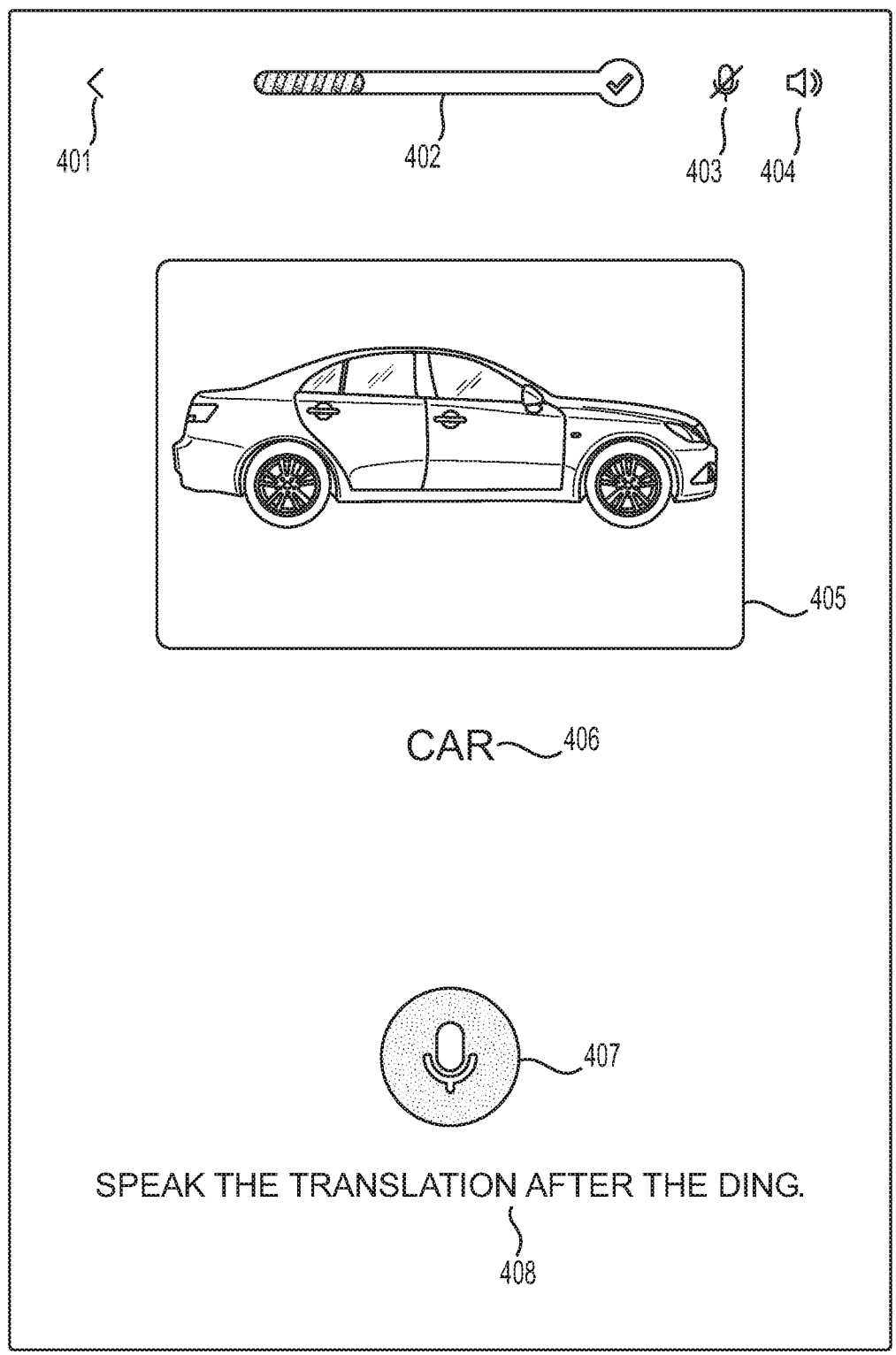
FIG. 4 shows the question screen, which is the next screen of the app after the lesson is selected.

FIG. 4 shows the question screen, which is the next screen of the app after the lesson 302 is selected. The lesson 302 is comprised of a series of practice "questions," where a user is prompted with a word or phrase in their native language, which they must translate into the target language. The system presents a written form of the question prompt 406. In the example shown, the word "car" is displayed, which is the term in the user's origin language, which the user will attempt to translate to the target language. The system presents the question prompt visual 405 for the question prompt 406. In this example, a picture of a car is shown.

When a question starts, the system will automatically play the audio for the text of the question prompt 406 in the same language as the text shown on the screen. The system presents a microphone icon 407, starting in blue, indicating the recording status of the microphone, which at this point has not started recording. As shown on the screen, the system presents a message 408 such as "Speak the translation after the ding" to the user about how to answer the questions. As an alternative method, the system may record the audio from the microphone throughout the entire lesson, listening for voice commands and user answers at any time throughout the experience.

The system presents a back button 401 that the user can click to exit the lesson. The system presents a progress bar 402 that increases as questions are answered. The bar is filled up based on the number of questions answered correctly (in blue) and the number of questions remaining (in grey). The system also presents a crossed-out microphone icon 403 that allows the users to turn off the speaking experience, and switch to a different question format, such as multiple choice or open input, which does not require voice input. In addition, the system presents a speaker icon 404 that allows the user to turn off the sound produced by the system.

Figure 5:
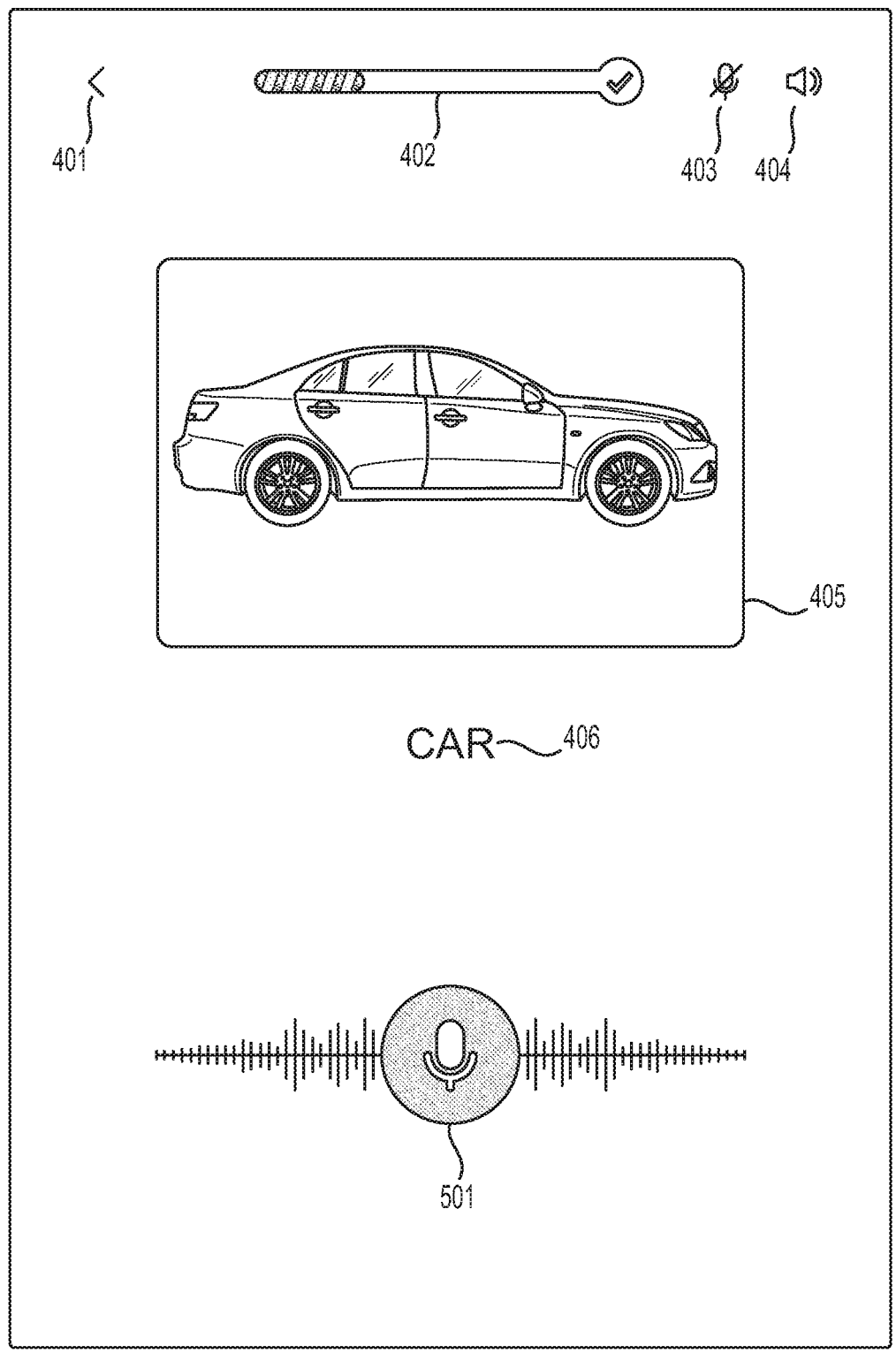
FIG. 5 shows the audio recording screen.

FIG. 5 shows the audio recording screen. After playing the prompt, the system will automatically provide an audio cue that indicates to the user that the system is now recording. If the computing device has a screen, a visual cue 501 also indicates the system is recording. The lines on the visualization rise and fall according to the volume level of the audio data being recorded.

While the recording is active, the user responds by attempting to say the word or phrase in the target language. The audio from the response is recorded and streamed to the system, which evaluates the speech in real time as it is coming in. The recording is stopped at the earlier of 1) the user speaking a correct answer or 2) the completion of a time limit, which can be adapted for each question. The time limit can vary, dynamically, based on the length of the possible correct answers. For example, if the question is: "How do you say 'He is happy'?" and the possible answers include: "Es feliz" and "Él está contento", the time limit for the system to listen for the correct response will extend to allow adequate time for the longest possible answer ("Él está contento"). The system will count all the words, syllables, and characters in the longest correct answer and expand the time limit for adequate time for an average language learner to respond. One exemplary approach is to have a default time limit of 3 seconds for single words and to add 1 second to the limit for each additional word. Another exemplary approach is to have a default of 3 seconds for a string that is 5 characters long and to add 1 second for each additional increment of 3 characters.

Figure 6:
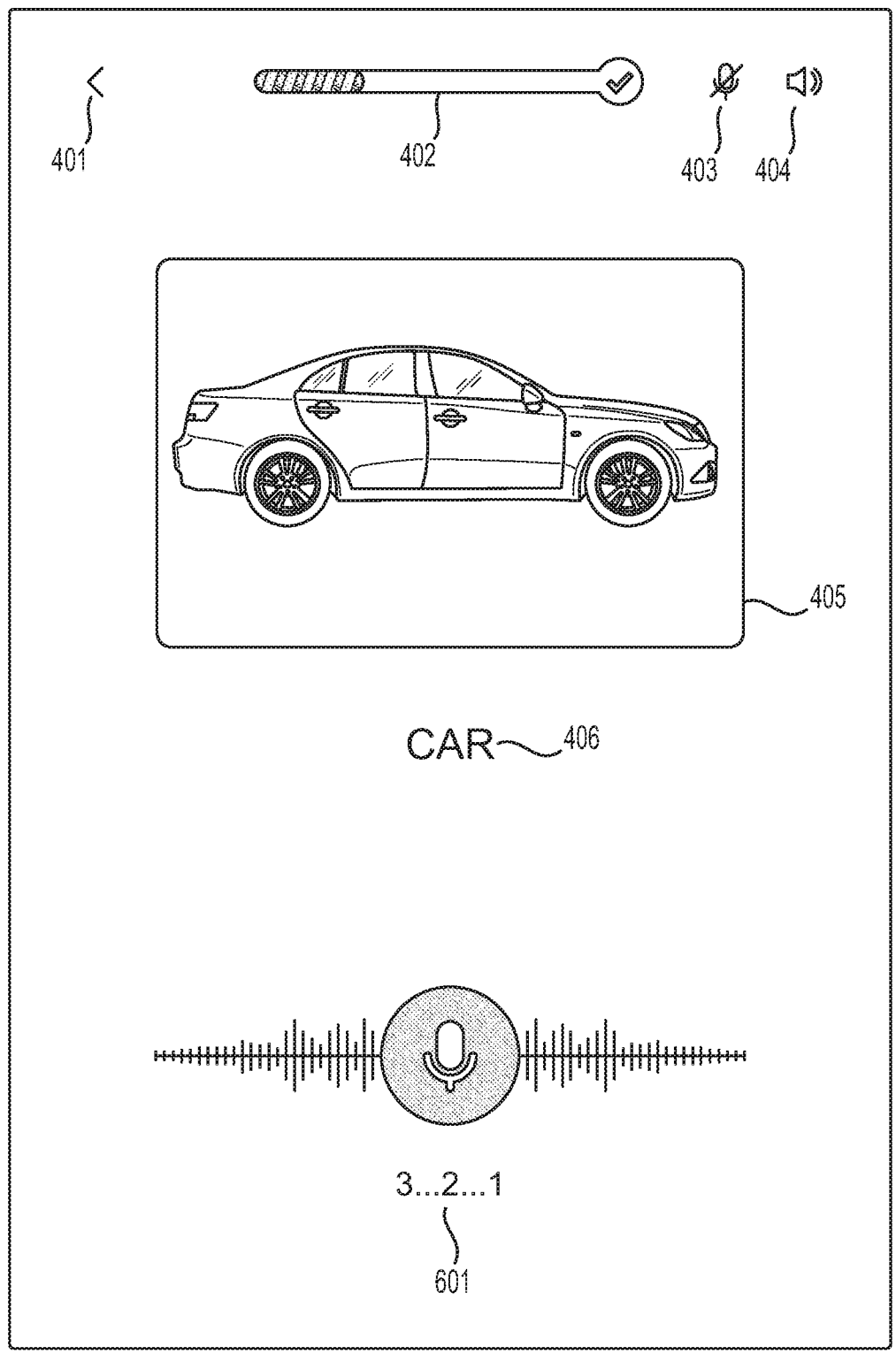
FIG. 6 shows the audio recording screen with a countdown timer.

FIG. 6 shows the audio recording screen with a countdown timer. As shown, the system may optionally display a visual indicator 601, such as a timer, text, or an hourglass, for the amount of time remaining.

Figure 7:
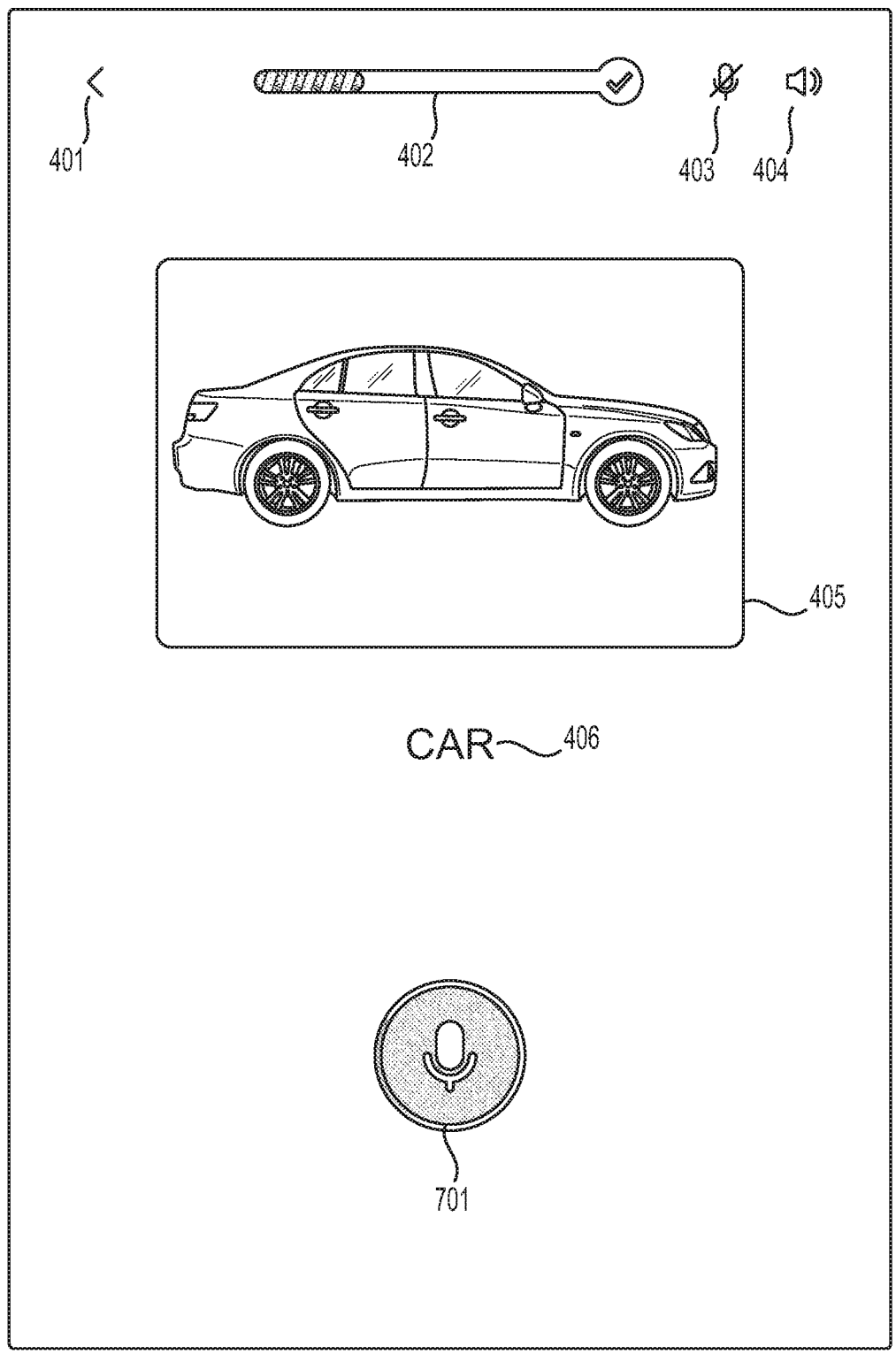
FIG. 7 shows the audio processing screen.

FIG. 7 shows the audio processing screen. When the time limit has been reached, if the system is evaluating the audio recording, a visual, such as the swoosh circling the recording icon 701, will indicate that the system is processing the information.

The speech audio is converted to text in real-time, as the user is speaking, either on the device or optionally sent to the server. The output of the speech recognition engine is evaluated against all possible correct answers (e.g., the English word "car" can be correctly translated into Spanish as both "coche" or "carro", so both could be considered correct answers). To decide whether an answer is correct, there are several possible methods.

Many speech recognition systems return more than one possible transcription. The system can search all the text transcriptions returned by the speech recognition engine. If there is a match between an alternate and one of the possible correct answers, it can mark the answer correct.

In another implementation, the system can search for the specific correct answers and evaluate the "confidence score" returned by the speech recognition engine. If the score is above a certain threshold, the system can mark the answer as correct. If not, it can mark the response as incorrect or provide another form of feedback.

Figure 8:
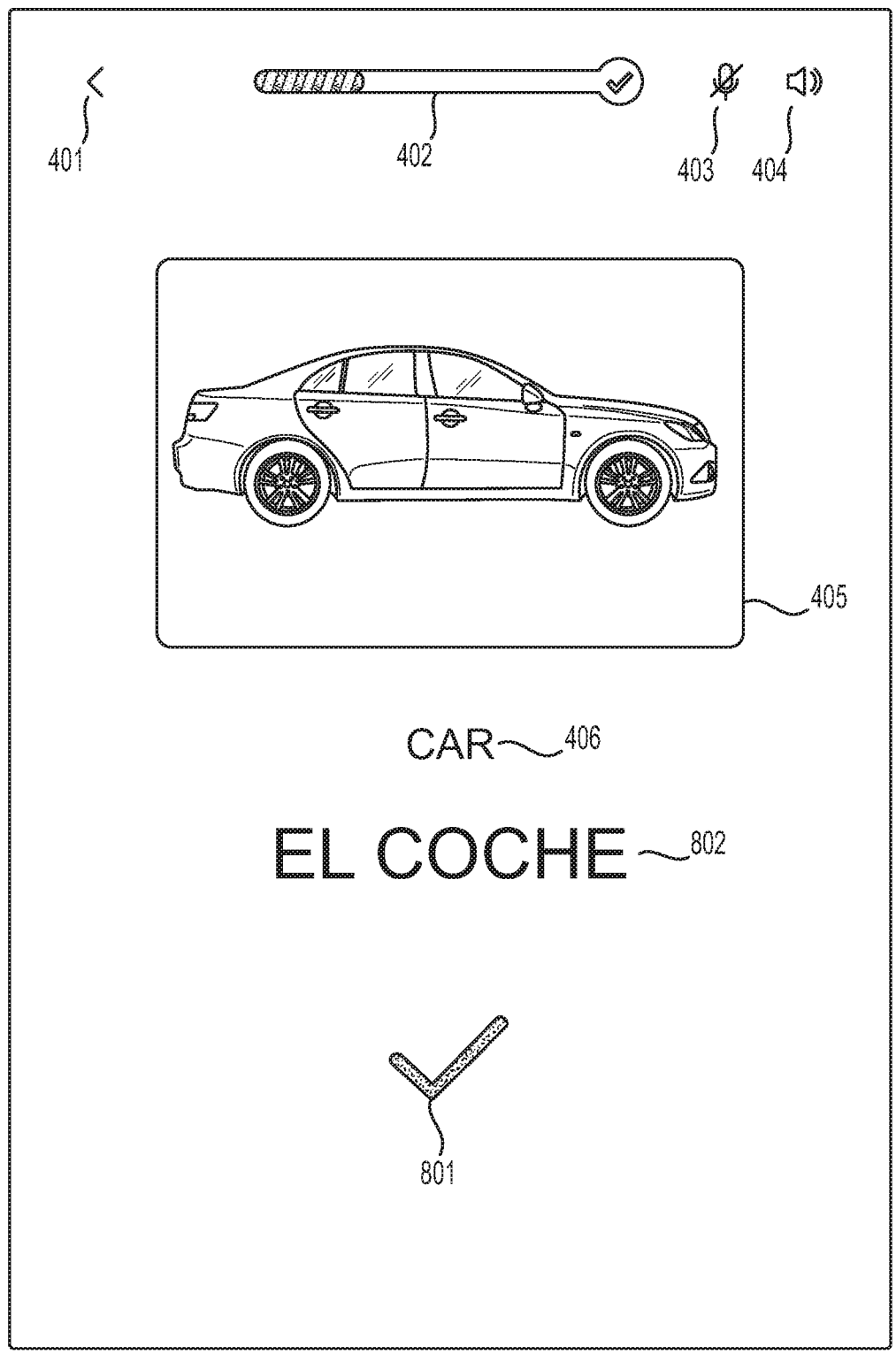
FIG. 8 shows the correct answer screen.

FIG. 8 shows the correct answer screen. When an answer is graded as correct, the system will provide auditory and visual feedback to the user, such as displaying the question prompt text smaller 406, displaying the correct translation 802, and changing the recording icon to a check mark 803. The system may optionally play the audio of the correct answer, providing extra listening practice for the user. The system may optionally show the text of the correct answer. Importantly, the system will automatically advance to the next question after a period of time, so the user doesn't need to look at or touch the computing device.

Figure 9:
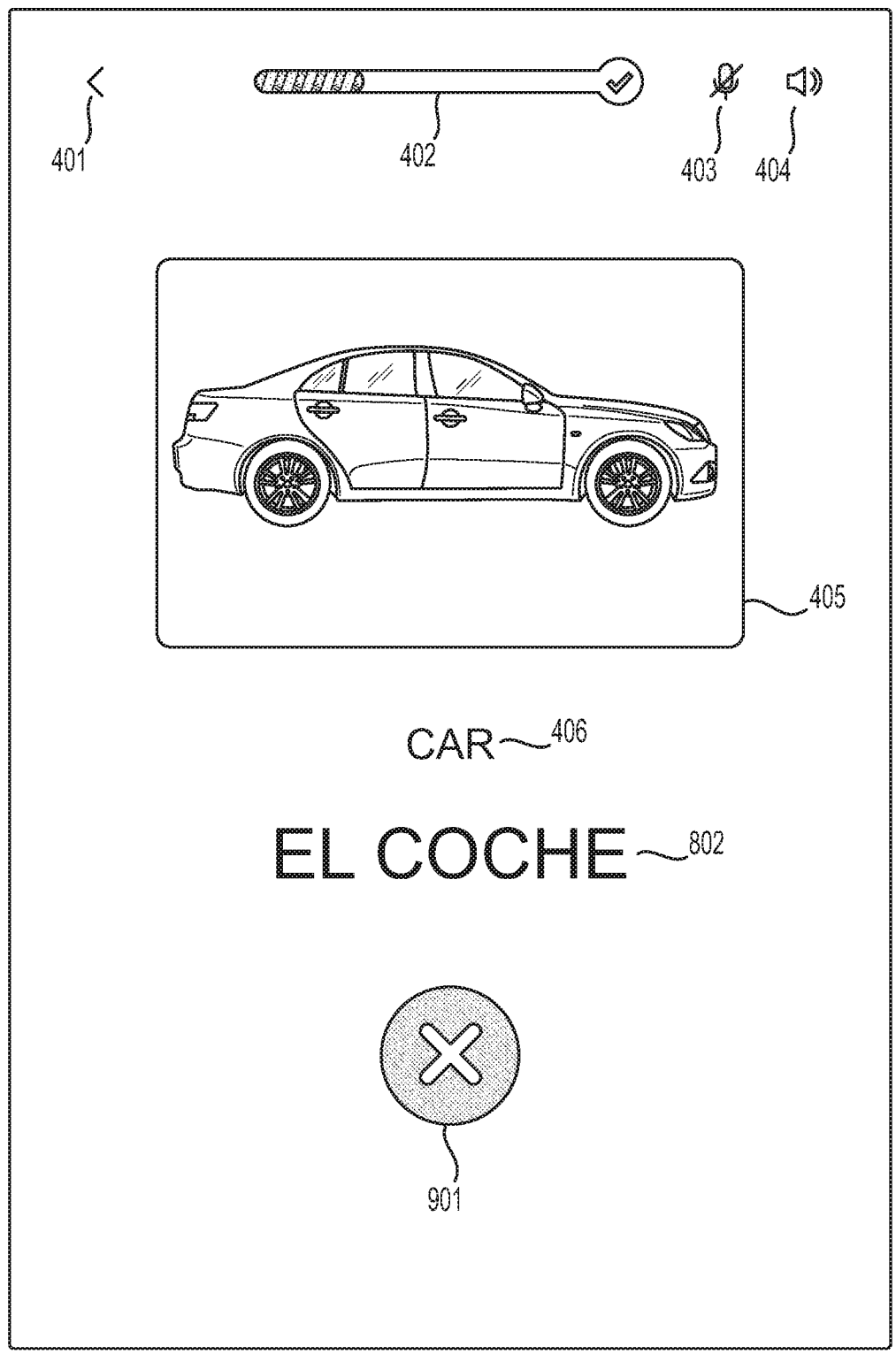
FIG. 9 shows the incorrect answer screen.

FIG. 9 shows the incorrect answer screen. When an answer is graded as incorrect, the system will provide auditory and visual feedback to the user. The system may optionally play the audio of the correct answer. The system may optionally shrink the text of the question prompt 406 to make space where the user is looking for the correct answer. The system may optionally show the text of the correct answer 802 and changing the recording icon to a check mark 901. In one implementation, the system automatically advances to the next question, so the user doesn't need to look at or touch the computing device.

When a user answers a question incorrectly, the system will automatically provide extra practice for the user later in the quiz. For example, if a user is asked to translate "car" and they answer the question incorrectly, the system inserts an additional practice question for the word "car" immediately after the incorrectly answered question and an additional practice question 5 questions later or at the end of the quiz, whichever is fewer, to provide more chances for the user to practice and learn the material. When the new questions are inserted, the blue progress indicator in the progress bar 402 is updated to reflect the actual progress of the quiz, by calculating the number of questions answered over the new number of questions remaining.

The number of additional questions and placement of additional questions within the quiz can be varied by any number of methods, including based on the difficulty of the question for this user and for other users—measured, for example, by the percent correct ratio for other people that have answered the same question. More challenging questions may receive more practice, and less challenging questions may receive less practice.

The subsequent questions can vary the content of the question, such as varying the image or text, while testing the same subject. The additional practice is not just added after the first attempt. Any subsequent incorrect answers also follow the logic described above to provide even more practice, with the general goal of providing users practice until they succeed in having learned the topic.

Because the quiz adapts to the user's knowledge in real-time, and provides additional practice on incorrect answers, it is conceivable that such a quiz could go on forever if a user continually misses a question over and over. This is a particularly acute problem when the reason the user is marked as incorrect is not because they speak the incorrect answer, but because the speech recognition system itself provided incorrect results. To avoid this problem, the system can set a maximum number of 2 or more repeated attempts for incorrect words, so that the quiz is guaranteed to end even if the users continuously is marked as incorrect for a given question. Alternative numbers of maximum attempts are possible.

Becoming proficient in a new language is not challenging because the concepts are hard to learn; it is challenging because they are hard to remember. Accordingly, when learning a new vocabulary word or grammar concept, learners often learn the topic quickly; however, they also forget it quickly. To commit a new concept to long-term memory requires repeated practice, spaced-out over time. This concept is called spaced repetition.

In one implementation, every time the user answers a question, the system tracks data relating to the attempt, including what question was answered, when it was answered, and whether it was correct or incorrect. The system can then use an algorithm or process to calculate an optimized time to next study the topic.

On the first time a user answers a question on a topic, if the user answers incorrectly, this suggests the user needs more practice. The next scheduled time for a review may therefore be in only 30 minutes. If a user answers correctly, it suggests the user has background knowledge in this topic, and the next scheduled review may be scheduled in two weeks.

On the subsequent times a user answers a question on a topic, if the user answers incorrectly, the user continues to need more practice and the next review date may be scheduled in 30 minutes. If the user answers correctly, the system will calculate the duration between this correct attempt and the previous attempt (the "time retained" for this topic). The system may then schedule the next review date based on a multiple between 2 times and 10 times of the time retained. If this amount is less than 1 day, the system may apply a minimum threshold of waiting 24 hours before the next review date, which allows the user's memory to consolidate the learning during at least one period of sleep.

An alternative approach uses a logistic regression model to calculate the probability that a user will retain a topic at any given point in the future. The modal's primary inputs are variables like the number of correct attempts, number of incorrect attempts, maximum time retained, the user's historical learning rate for similar topics, and other user's historical difficulty with this topic. Using this model, the system can schedule the next review date at a moment in time when the user's chance of remembering the topic dips below 50%, or some other threshold.

The system will select the new set of questions for the user to review on the lesson 302 that was selected. If the user has never studied the lesson 302 before, the system shows a set of questions ordered by the system, up to a maximum, for example of 20. If there are more than 20 questions to review, the study sessions may be broken into multiple parts.

If the user has studied the lesson 302 before, and there are more topics to be covered than allowed by the maximum number of questions, the system will select the topics that need review (e.g., their scheduled review date is in the past), up to the maximum. The system may optionally include some new topics to review, for example, designating 16 questions for review, and 4 questions for new topics. The new and review questions can be randomly shuffled, review can be shown first and then new, or new can be shown first and then review.

Figure 10:
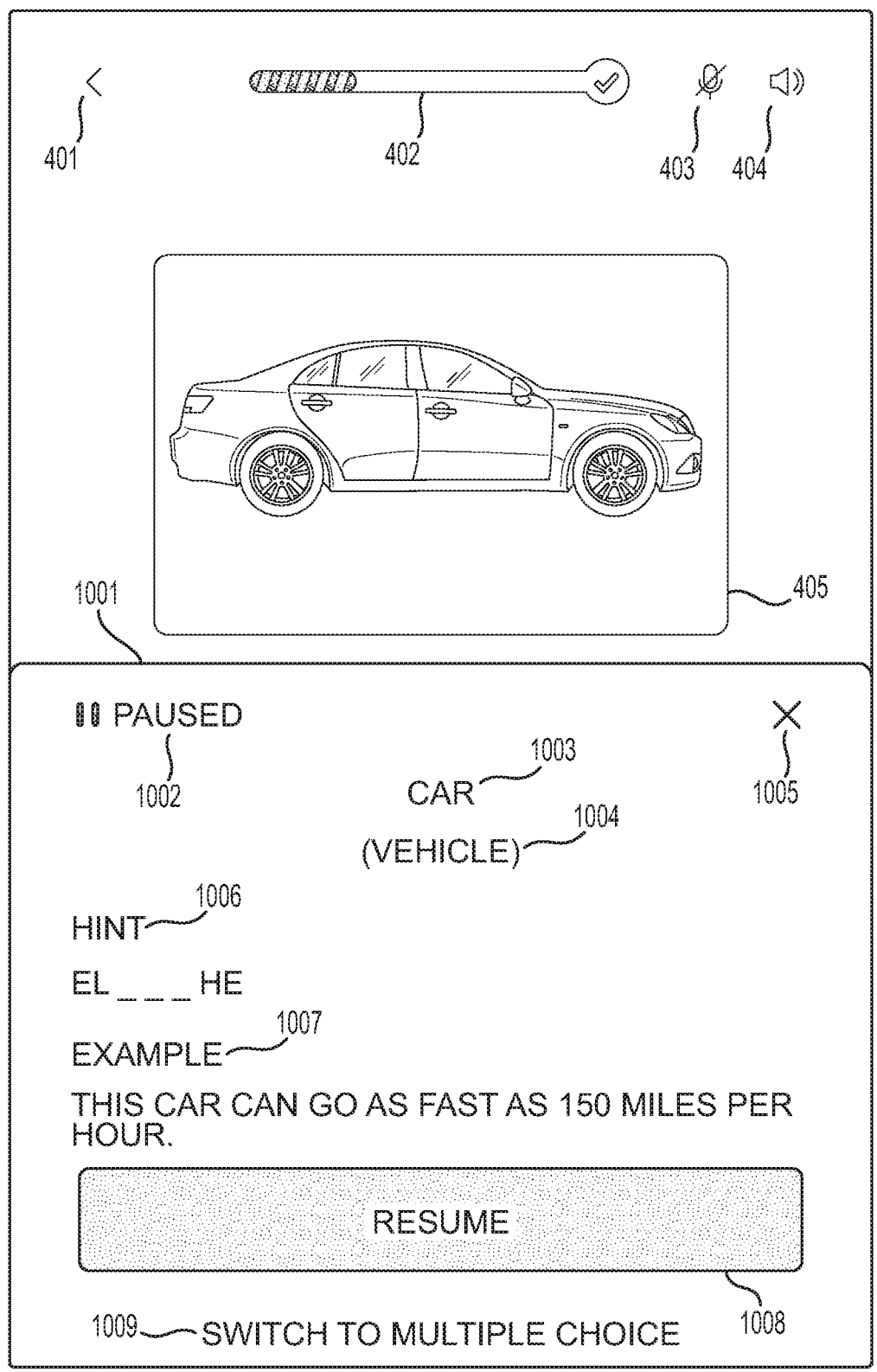
FIG. 10 shows the pre-answer word information screen.

FIG. 10 shows the pre-answer word information screen. Before a user answer, the system may include text, audio, or images to disambiguate the correct answer from alternate correct answers (e.g., the English word "car" can be correctly translated into Spanish as both "coche" or "carro"; to disambiguate what the system is looking for, there may be a semantic hint, geographic hint, spelling hint, or other hint, written, spoken or represented visually). When a user selects the text 406 or visual 405 of the question prompt, the system may show additional information about the prompt 1001.

The system may show a message 1002 that the quiz has been paused and may show the question prompt text 1003 again. The system may show the context in which the question prompt is used 1004. In this case, the question prompt "car" could mean car as in "automobile" or car as in "railroad car". The context clue of "vehicle" disambiguates these meanings. The system may also show a spelling hint 1006. In this case, "car" as in automobile can be translated correctly as either "coche" or "carro", and the spelling hint disambiguates which one the system is looking for.

Additionally, the system may show an example sentence, adding additional context for how the question prompt is used in context 1007. The system may show a button to "Resume" practicing the quiz 1008 and a button to switch to a different question format 1009.

After a user answers a question, they may select the question prompt 801 or the answer 802 to see additional information about the topic.

Figure 11:
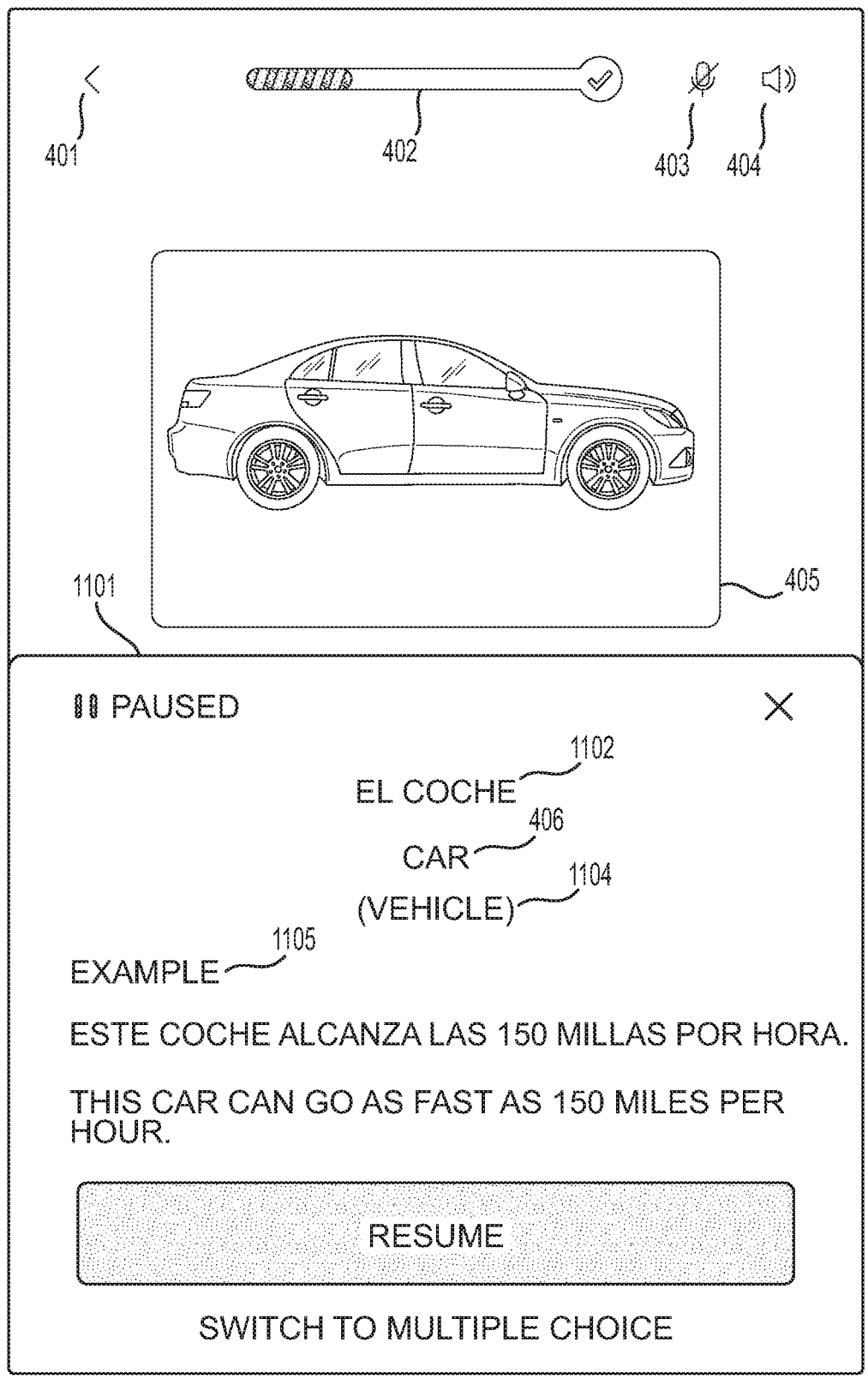
FIG. 11 shows the post-answer word information screen.

FIG. 11 shows the post-answer word information screen. On the word information screen 1101, the system may show the question answer 1102, question prompt 406, context clue 1104, and an example sentence with the translation 1105.

If the user answers with an incorrect translation, but the answer is in fact a known word, the system can respond with a tip letting the user know what the wrong answer means. For example, if the user responded to the question prompt "car" with the answer "caro", the system may show a message like "Tip: caro means expensive". To accomplish this task, when grading the transcripts of the spoken replies, the top transcriptions can be compared a list of all the possible words in the target language. If a match is found, the word and its translation can be displayed in the tip. For post-question message and other, the message may be displayed on the screen or spoken aloud, and adequate time will be allowed for the user to understand the message before moving to the next question.

If a user speaks the correct word, but makes a pronunciation mistake, the system may provide feedback on the error and information on how to correct it. For example, if the user replies to the question prompt for "car" with a phonetic sound like "cay-ro" (using a long "a") rather than a phonetic sound like "ca-ro" (using a short "a"), the system may show a tip like "Remember to use the short 'a' sound" and highlight the mistaken syllable when showing the correct answer, like "carro".

Figure 12:
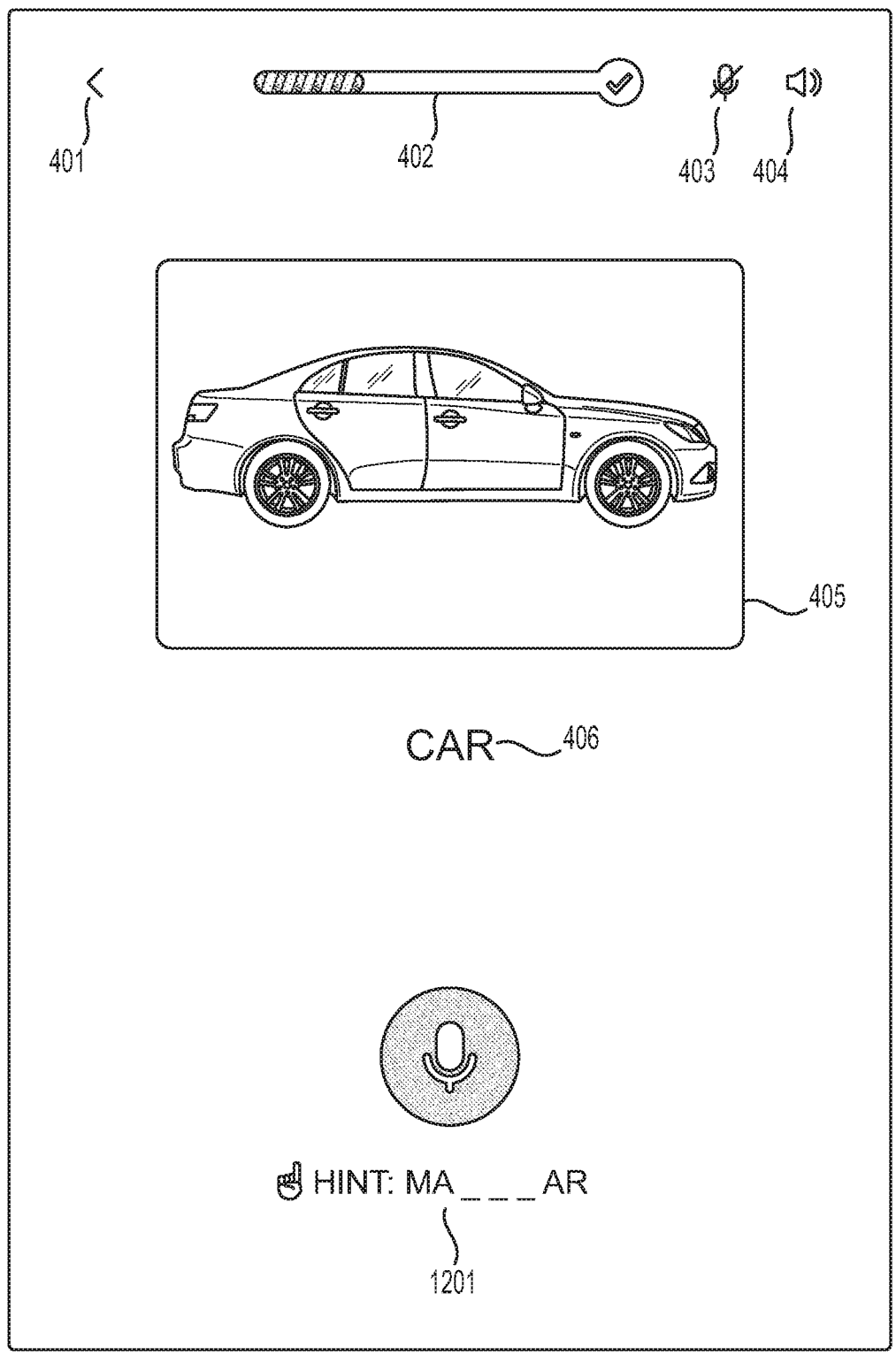
FIG. 12 shows a disambiguation hint screen.

FIG. 12 shows a disambiguation hint screen. In some instances, the system is looking for a specific translation or specific answer—and the user provides an alternate correct answer. When a user provides an answer that is correct, but not the intended response that the system is looking for—for example, translating "boy" as "niño" when the system was looking for "chico"—the system may provide an auditory and visual message 1201 that the answer is correct, but not what was sought. For example, the system may play audio in the user's origin language of one of the disambiguation techniques described below (e.g., "Try the informal translation", or "Try a five letter form that ends with 'co'", or "Hint: ma_ _ _ _ar). The program will then automatically give the user another attempt at identifying the correct answer. The alternate correct answers can be determined at the outset of the lesson when the questions are assembled or calculated on the fly by looking up the answers among a list of, for example, all the target language words and their translations.

A message in text and/or audio (not shown) appears if the user gets 10 or more answers incorrect consecutively, suggesting that accuracy of the voice recognition may be low. A user can continue with the quiz. The user can switch to another type of quiz, such as multiple choice or open input.

A message in text and or audio (not shown) indicates if the microphone receiving no audio or low-quality audio. The user can continue with the quiz. The user can switch to another type of quiz, such as multiple choice or open input.

To the extent the system relies on a speech recognition that requires an internet connection, if the system detects that the user has lost an internet connection, it will play an audio indicator (not shown) alerting the user that the internet is offline and show a message indicating the connection is weak or unavailable.

Figure 13:
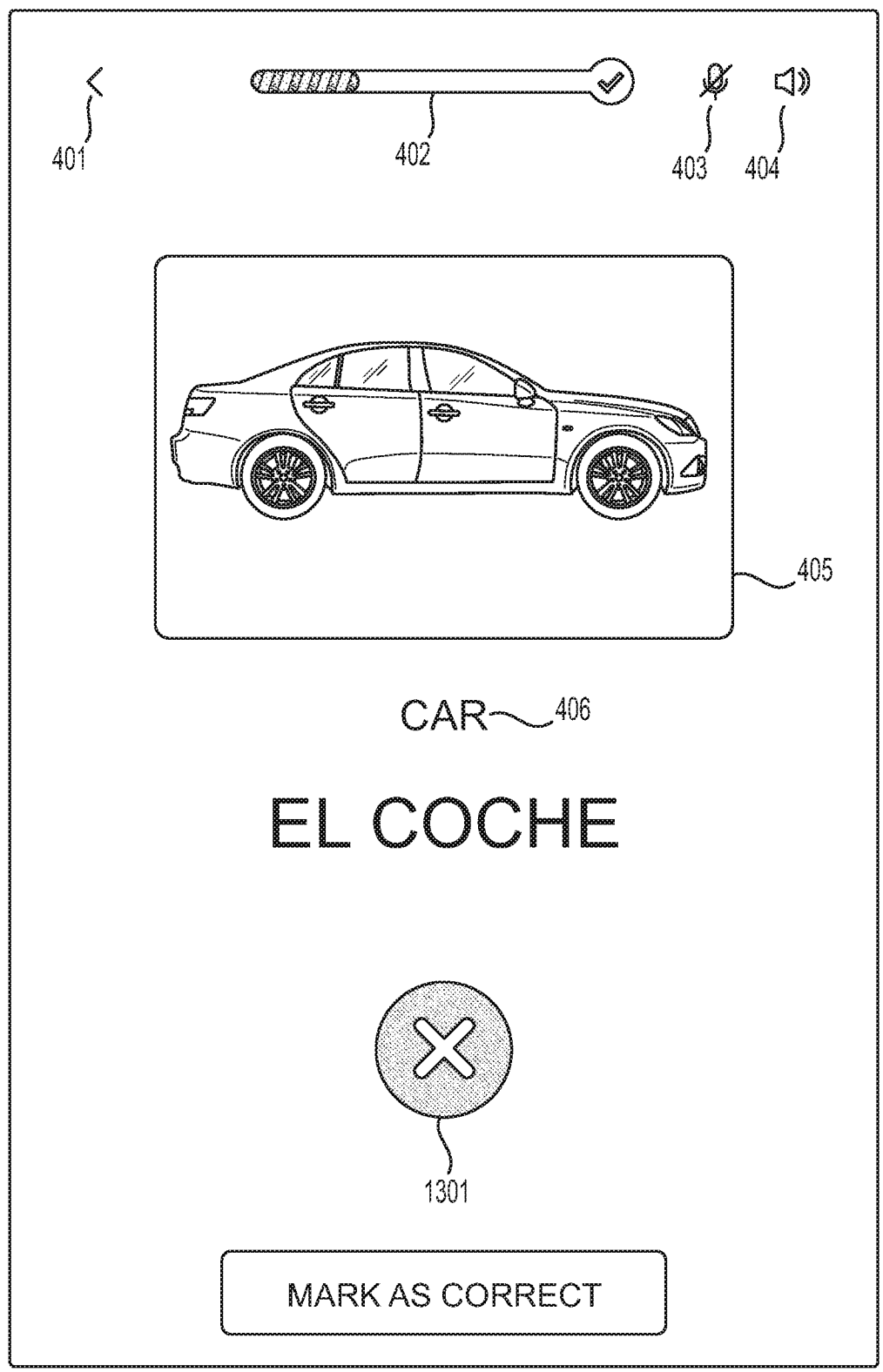
FIG. 13 shows the manual mark as correct screen.

FIG. 13 shows the manual mark as correct screen. The system may allow users to manually override the grade the system provides, by pressing the "Mark as correct" button 1301 marking an incorrectly graded word as correct. The system may allow a user to override a previously graded message by tapping a button on the screen, or speaking a particular keyword (e.g., "Mark Correct"). If a user manually overrides the speech recognition system, the adaptive learning logic for the lesson 302 and spaced repetition logic will be updated to treat the answer as if it were answered correctly.

A user may be marked incorrect because they spoke the wrong answer or because the speech recognition engine incorrectly graded the audio. The system is designed to automatically detect instances where the speech recognition engine made mistakes. The method for accomplishing this is by allowing a user to answer a question, and upon an answer graded as incorrectly, immediately playing the correct answer, and then showing the question again, where a user just has to repeat the correct answer that was just played. If this second attempt, which is just repetition after hearing the correct answer, matches the first attempt, where the user had to produce the utterance on their own, the system can assume that there was a high likelihood that the first attempt was in fact correct.

Figure 14:
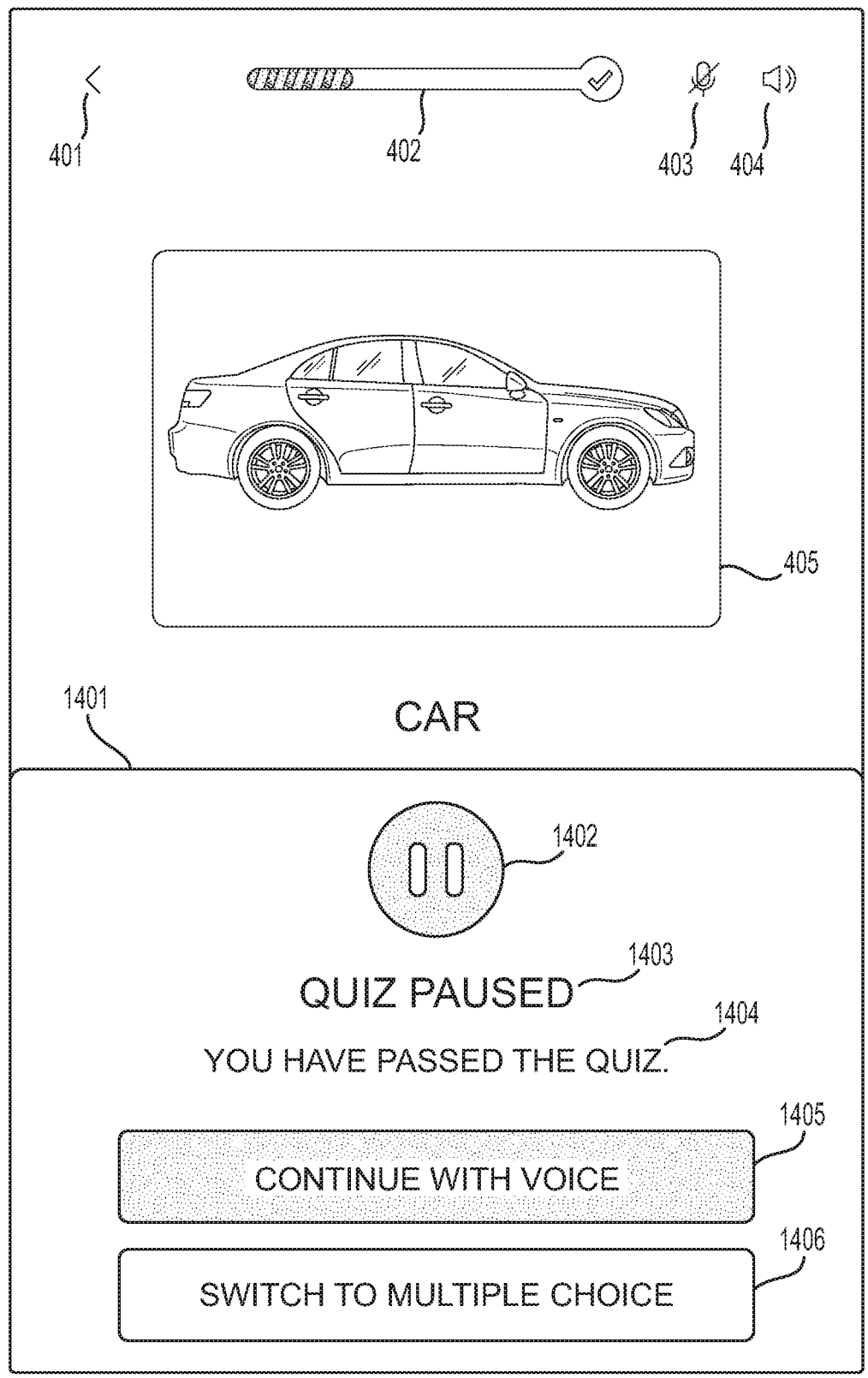
FIG. 14 shows the quiz paused screen.

FIG. 14 shows the quiz paused screen. When a user clicks on the microphone icon 403 or indicates with their voice that they want to pause the quiz, a visual indicator may appear 1401 showing that the quiz has paused 1402, 1403, and 1404. The user may resume the lesson 1405. The user may switch to other question formats methods, such as open-input or multiple choice, and maintain their progress in the lesson 1406.

Figure 15:
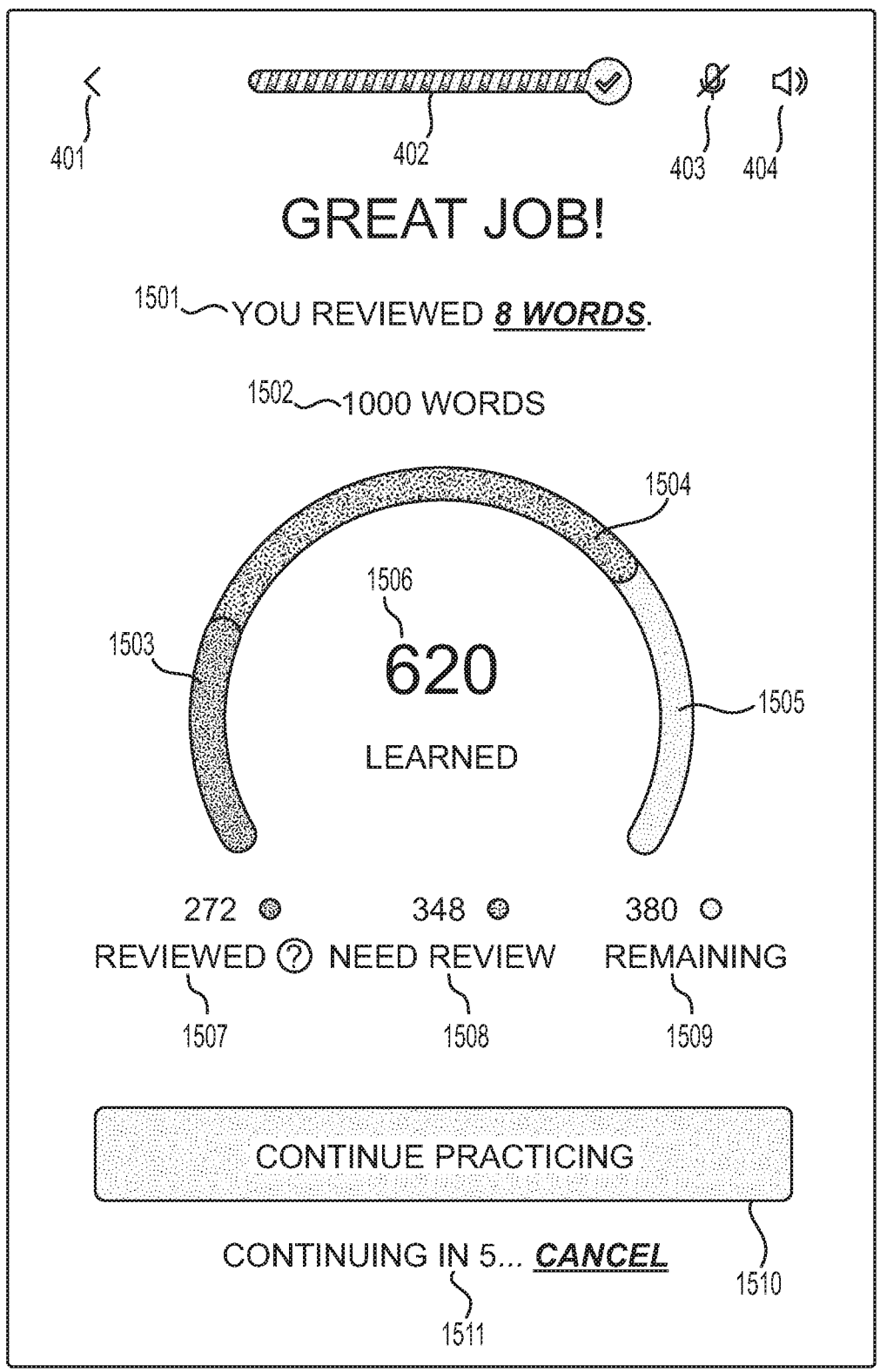
FIG. 15 shows the lesson completion screen.

FIG. 15 shows the lesson completion screen. The lesson is complete after all the questions have been answered. The system may show how many words were studied 1501. The system may show how many words are in the entire lesson 1502. The system may show how many words the user has been exposed to 1503 and has reviewed sufficiently at this point according to the scheduled date calculated using the spaced repetition logic.

The system may show how many words need review 1504 according to the spaced repetition logic. The system may show how many words remain to be seen 1505. The system may show the total number of words learned 1506 including those that have been reviewed and those that need review. The system may show a specific count of the words that have been reviewed 1507. The system may show a specific count of the words that need review 1508. The system may show a specific count of the words that remain to be seen 1509. The system may show a button 1510 to allow the user to continue practicing in this lesson. The system may show a countdown timer 1511 for how many seconds remain before the system automatically advances to the next section of the lesson. The system may show a "cancel" button that allows the user to cancel the auto-advance logic 1511. A user can select the number of words 1501 to review more data on about those words (FIG. 16).

Figure 16:
FIG. 16 shows the review schedule screen.

FIG. 16 shows the review schedule screen. If a user selects the number of words reviewed 1501, they will see more information on each word 1601. The system may show the review schedule for the words just studied, and an icon 1602 to learn more about how the spaced repetition system works. The system may show the specific words and translations 1603 reviewed in the lesson. The system may show when the next review time 1604 has been scheduled for each word. The system may allow the user to create a new quiz based on the words that word missed on the initial attempt in the quiz that was just completed by clicking the "Practice words I missed" button 1605.

Figure 17:
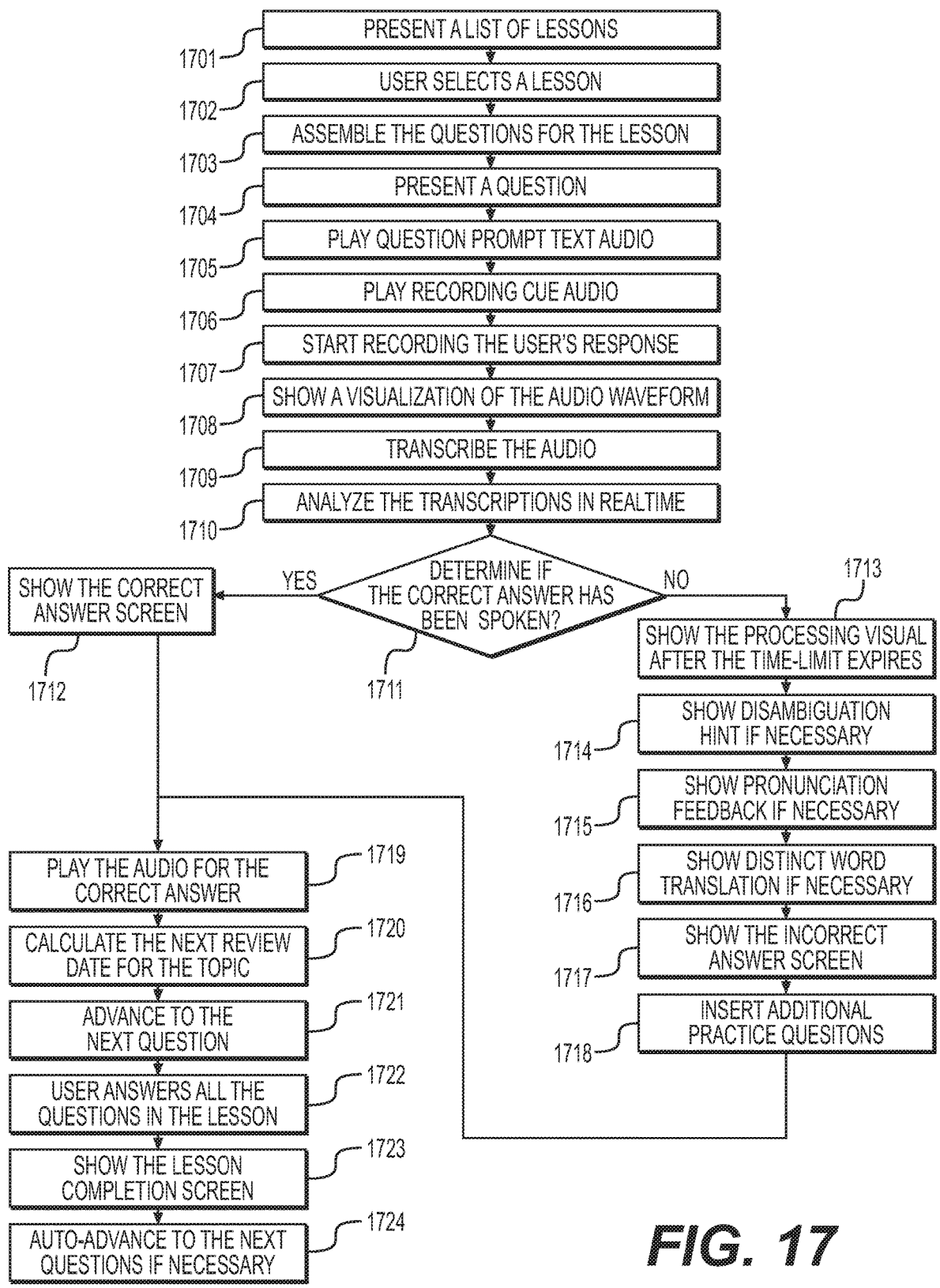
FIG. 17 shows the application flow chart.

FIG. 17 shows the application flow chart. The application presents the list of lessons (step 1701). Then the user selects a lesson (step 1702). Then the application assembles the questions for the lesson (step 1703). Then the application presents a question (step 1704). Then the application plays the audio for the question prompt (step 1705).

Then the application plays the audio cue that recording has started (step 1706). Then the application starts recording the user's response (step 1707). Then the application shows a visualization of the audio way form (step 1708). Then the application transcribes the audio (step 1709). Then the application analyzes the transcriptions in real-time: (step 1710).

Then the application determines if the correct answer has been spoken (step 1711). If yes, then the application shows the question answer screen if the correct answer is found (step 1712). If no, then the application shows the processing visualization when the time-limit expires (step 1713). Then the application shows a disambiguation hint if an alternate correct answer is found and provides a user with another chance (step 1714). Then the application shows a pronunciation tip if a pronunciation mistake is found (step 1715). Then the application shows a distinct word translation if a distinct word is found (step 1716).

Then the application shows the incorrect answer screen (step 1717). Then the application inserts additional practice questions in the quiz (step 1718). Then the application plays the audio for the correct translation (step 1719). Then the application calculates the next review data for the topic (step 1720). Then the application advances to the next question (step 1721). Then the application user answers all the questions in the lesson (step 1722). Then the application shows the lesson completion screen (step 1723). Then the application auto-advances to the next set of questions in the lesson, provided there are additional topics to cover (step 1724).

Because the system does not rely on screens for communicating any critical information to the user or receiving any critical commands from the user, it can be run on voice-activated speakers and other computing devices where a screen is unavailable. When running on a speaker, in addition to analyzing the audio transcriptions for user answers, the system would also listen for specific commands, such as "pause", "resume", and "exit". Because these words could be part of a user's legitimate response, these commands could be preceded by a keyword. So, for example, the user may say "System, pause" to pause the quiz. When providing incorrect answer feedback, the feedback would be spoken aloud. For example, for word disambiguation, instead of displaying "Hint: c a_ _o" the system would speak the hint aloud, saying for example, "A five letter word that starts with 'c' 'a' and ends with 'o'". At the end of the quiz, the user's stats would be read aloud. For example, the system may say, "You learned 3 new words and reviewed 17 words. You now have 380 words remaining out of 1000. Would you like to continue practicing?" at which point the user could answer yes or no to continue. An auto-play setting could optionally be enabled to allow the user to automatically continue practicing.

The system can also be used in augmented reality devices. Instead of placing the picture of the question prompt on the screen, a 3D model of the picture could be placed into the user's field of view. Alternatively, the system could use image recognition to identify objects in the user's surroundings use those to generate the question prompts.

The system can also be used in a virtual reality device. For the question prompts, instead of using 2D images or videos on a screen, 3D representations of the images or videos could be used.

The method in which the user is prompted in a question can vary. The question prompt 406 may use the origin language term, a fill in the blank question (where a user must speak the correct word for the blank), or a definition or description in the target language of what the user must produce in the target language.

The accompanying visual information can also vary. The question prompt visual 405 may be an image, a moving image (such as a GIF), a video, or a 3D representation.

The supplementary information 1001 and 1101 can also vary. The supplementary information 1001 and 1101 may contain an example sentence showing how to use the word, spelling hints for the correct answer, or written, auditory, and visual information on how to pronounce the term.

The supplementary information 1001 and 1101 may also contain grammatical information, such as the part of speech, the context in which the word is used, or common phrases used with a word, tips on how to remember the word based on how it sounds or how it is written, or related terms, such as collocates, synonyms, antonyms, inflections, false cognates, idioms, regionalisms, and other related terms. The supplementary information 1001 and 1101 may contain word root and etymology information. Any of the supplementary information items may be displayed or read aloud from the question screen (FIG. 4), correct answer screen (FIG. 8), or incorrect answer screen (FIG. 9).

The question type can also vary. The question may be a multiple-choice question, where a user is presented with a set of options and speaks their selection. The question may be a fill in the blank question, where a user speaks the answer that correctly fills in the blank section of a sentence.

The direction in which the question is framed can also vary. The question prompt 406 may be in the origin language and the user's response may be in the target language, which would help with speaking practice. The question prompt 406 may be in the target language and the user's response may be in the origin language, which would help with comprehension practice. The question prompt 406 may be in the target language and the user's response may be in the target language, which would help with both comprehension and speaking practice. For example, for an English speaker learning Spanish, the prompt may be "Automóvil destinado al transporte de personas" (which means "an automobile used to transport people") and the target response may be "coche" (which means "car").

The adaptive lessons can be used to teach a variety of language topics. The adaptive lessons can be used to teach vocabulary in the target language, pronunciation in the target language (such as how to pronounce certain letters, syllables, words, or phrases), grammar in the target language (such as how to conjugate verbs in the target language), conversational skills in the target language (such as how to speak whole sentences in the target language), and comprehension skills in the target language (where the user is demonstrating that they understood a spoken text by responding in the target language).

The foregoing description of various embodiments provides illustration and description but is not intended to be exhaustive or to limit the invention to the precise form disclosed. Modifications and variations are possible in light of the above teachings or may be acquired from practice in accordance with the present invention. It is to be understood that the invention is intended to cover various modifications and equivalent arrangements included within the spirit and scope of the appended claims.

What is claimed is:

1. A method in conducting a lesson using a data processing system for hands-free and eyes-free automated adaptive language learning, comprising:
   transmitting, from a processor of the data processing system via an audio output device in electronic communication with the processor, an audio prompt of a first term in an origin language for the user to learn a translation in a target language;
   receiving, at the processor via a microphone in electronic communication with the processor, a recording of audio from the user;
   analyzing, using the processor, the recording of audio to determine whether the received audio comprises a voice control command or an attempted translation of the first term in the target language;
   determining, using the processor, if the user accurately stated a translation of the first term in the target language in the recording; and
   if the user did not state the translation of the first term accurately in the recording, transmitting, from the processor via the audio output device, a second audio prompt of a second term to the user based on the first term;
   wherein the transmitting, receiving, analyzing, and determining are performed without requiring the user to touch an input device.

2. The method of claim 1, further comprising:
   if the user did not state the first term accurately, scheduling a future time to transmit an audio prompt to the user with the first term.

3. The method of claim 1, wherein the second term is related to a same topic as the first term.

4. The method of claim 1, further comprising:
   transmitting an audio clue to disambiguate two potential meanings for the first term.

5. The method of claim 1, further comprising:
   repeatedly transmitting an audio prompt of the first term to the user up to a maximum of a pre-determined number of times when the user provides incorrect responses.

6. The method of claim 1, further comprising:
   transmitting additional information for context comprising one of: (1) a context clue and (2) an example sentence including the first term with a translation hint.

7. The method of claim 1, further comprising:
   if the user did not state the first term accurately in the recording, transmitting an accurate translation of the first term for feedback to the user.

8. The method of claim 1, wherein the transmitting and receiving the recording are performed by a voice-activated speaker device.

9. The method of claim 1, wherein the transmitting and receiving the recording are performed in one of: a (1) virtual reality device and (2) an augmented reality device.

10. The method of claim 1, wherein the analyzing the recording of the received audio is in real-time.

11. The method of claim 1, further comprising:
    automatically advancing by transmitting a third audio prompt of a third term;

after a predetermined period of time, without further user interaction.

12. The method of claim 1, wherein the audio prompt of the first term is one of: (1) a translation of the first term from the origin language to the target language to test if the user can state the first term in the origin language, (2) a fill-in-the-blank sentence in the target language to test if the user can provide a missing term in the target language from the fill-in-the-blank sentence, (3) a series of terms in the target language provided as multiple choice to be selected by the user, and (4) a question in the target language for the user to answer in the target language.

13. The method of claim 1, further comprising:
detecting one of: (1) silence and (2) a series of incorrect answers;
automatically pausing the lesson based on the detection; and
prompting the user to confirm continuing with speech recognition.

14. The method of claim 1, further comprising:
receiving one or more indications from the user to manually override an incorrectly graded response; and
updating one or more responses in the system to be indicated as graded correctly based on the received one or more indications.

15. The method of claim 1, further comprising:
dynamically varying a length of time in which the recording of audio is recorded by the user based on a length of possible correct answers.

16. A data processing system for hands-free and eyes-free automated adaptive language learning, comprising:
a processor configured to execute instructions stored in a memory;
an audio output device in electronic communication with the processor;
a microphone in electronic communication with the processor; and
the memory configured to store the instructions, wherein the instructions are configured to cause the processor to conduct a lesson including:
transmitting, via the audio output device, an audio prompt of a first term in an origin language for the user to learn a translation in a target language;
receiving, via the microphone, a recording of audio from the user;
analyzing the recording of audio to determine whether the received audio comprises a voice control command or an attempted translation of the first term in the target language;
determining if the user accurately stated a translation of the first term in the target language in the recording; and
if the user did not state the translation of the first term accurately in the recording, transmitting via the audio output device a second audio prompt of a second term to the user based on the first term;
wherein the processor configured to execute the instructions without requiring the user to touch an input device.

17. The data processing system of claim 16, wherein the instructions further cause the processor to:
if the user did not state the first term accurately, schedule a future time to transmit an audio prompt to the user with the first term.

18. The data processing system of claim 16, wherein the second term is related to a same topic as the first term.

19. The data processing system of claim 16, wherein the instructions further cause the processor to:
transmit an audio clue to disambiguate two potential meanings for the first term.

20. The data processing system of claim 16, wherein the instructions further cause the processor to:
repeatedly transmit an audio prompt of the first term to the user up to a maximum of a pre-determined number of times when the user provides incorrect responses.

21. The data processing system of claim 16, wherein the instructions further cause the processor to:
transmit additional information for context comprising one of: (1) a context clue and (2) an example sentence including the first term with a translation hint.

22. The data processing system of claim 16, wherein the instructions further cause the processor to:
if the user did not state the first term accurately in the recording, transmit an accurate translation of the first term for feedback to the user.

23. The data processing system of claim 16, wherein the transmitting and receiving the recording are performed by a voice-activated speaker device.

24. The data processing system of claim 16, wherein the transmitting and receiving the recording are performed in one of: a (1) virtual reality device and (2) an augmented reality device.

25. The data processing system of claim 16, wherein the analyzing the recording of the received audio is in real-time.

26. The data processing system of claim 16, wherein the instructions further cause the processor to:
automatically advance by transmitting a third audio prompt of a third term after a predetermined period of time, without further user interaction.

27. The data processing system of claim 16, wherein the audio prompt of the first term is one of: (1) a translation of the first term from the origin language to the target language to test if the user can state the first term in the origin language, (2) a fill-in-the-blank sentence in the target language to test if the user can provide a missing term in the target language from the fill-in-the-blank sentence, (3) a series of terms in the target language provided as multiple choice to be selected by the user, and (4) a question in the target language for the user to answer in the target language.

28. The data processing system of claim 16, wherein the instructions further cause the processor to:
detect one of: (1) silence and (2) a series of incorrect answers;
automatically pause the lesson based on the detection; and
prompt the user to confirm continuing with speech recognition.

29. The data processing system of claim 16, wherein the instructions further cause the processor to:
receive one or more indications from the user to manually override an incorrectly graded response; and
update one or more responses in the system to be indicated as graded correctly based on the received one or more indications.

30. The data processing system of claim 16, wherein the instructions further cause the processor to:
dynamically vary a length of time in which the recording of audio is recorded by the user based on a length of possible correct answers.

* * * * *